US009514501B2

(12) United States Patent
Liang et al.

(10) Patent No.: US 9,514,501 B2
(45) Date of Patent: Dec. 6, 2016

(54) SYSTEMS AND METHODS FOR MULTIMEDIA-PROCESSING

(71) Applicant: Tencent Technology (Shenzhen) Company Limited, Shenzhen (CN)

(72) Inventors: Zhu Liang, Shenzhen (CN); Jinkai Ouyang, Shenzhen (CN); Mingwei Zhang, Shenzhen (CN); Dali Chen, Shenzhen (CN); Xiaojun Huang, Shenzhen (CN); Xian Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 167 days.

(21) Appl. No.: 14/476,066

(22) Filed: Sep. 3, 2014

(65) Prior Publication Data

US 2014/0369551 A1 Dec. 18, 2014

Related U.S. Application Data

(63) Continuation of application No. PCT/CN2013/089582, filed on Dec. 16, 2013.

(30) Foreign Application Priority Data

Jun. 14, 2013 (CN) .......................... 2013 1 0236260

(51) Int. Cl.
*G06K 9/00* (2006.01)
*G06T 1/00* (2006.01)
*G06F 21/16* (2013.01)

(52) U.S. Cl.
CPC ............. *G06T 1/0021* (2013.01); *G06F 21/16* (2013.01); *G06T 2201/005* (2013.01)

(58) Field of Classification Search
CPC ...... G06T 1/0021; G06T 1/005; G06T 1/0028; G06T 2201/0051; G06T 2201/0065; G06T 1/0085; G06T 2201/0052; G06T 2201/005; G06T 1/0042; G06T 1/0071; G06T 2201/0061; G06T 2201/0601
See application file for complete search history.

(56) References Cited

U.S. PATENT DOCUMENTS 8,055,899 B2 * 11/2011 Levy et al. ............. G06F 21/10
                                                    705/57
9,058,645 B1 * 6/2015 Corley et al. ......... G06T 7/0012
(Continued)

FOREIGN PATENT DOCUMENTS

CN    101072340 A    11/2007
CN    102156734 A    8/2011
(Continued)

OTHER PUBLICATIONS

Patent Cooperation Treaty, The International Search Report and the Written Opinion of the International Searching Authority, mailed Mar. 20, 2014, in PCT/CN2013/089582.
(Continued)

*Primary Examiner* — Stephen R Koziol
*Assistant Examiner* — Jonathan S Lee
(74) *Attorney, Agent, or Firm* — Jones Day

(57) ABSTRACT

Systems and methods are provided for multimedia processing. For example, upon receipt of a multimedia-information-release request, multimedia information to be released is acquired; whether the multimedia information contains watermark information is detected; in response to the multimedia information containing the watermark information, a first topic matching with the watermark information is searched for within one or more predetermined second topics, and the multimedia information and the first topic matching with the watermark information are released.

16 Claims, 9 Drawing Sheets

(56) References Cited

U.S. PATENT DOCUMENTS

| | | | |
|---|---|---|---|
| 2003/0116627 A1 | 6/2003 | Wolthusen et al. | |
| 2006/0072785 A1* | 4/2006 | Davidson et al. | G06T 1/0071 382/100 |
| 2008/0275906 A1* | 11/2008 | Rhoads et al. | G06F 17/30026 |
| 2013/0260727 A1* | 10/2013 | Knudson et al. | G06Q 30/00 455/414.1 |
| 2015/0016661 A1* | 1/2015 | Lord | H04N 21/42203 382/100 |
| 2015/0235336 A1* | 8/2015 | Crutchfield et al. | G06F 17/3028 382/100 |

FOREIGN PATENT DOCUMENTS

| | | |
|---|---|---|
| CN | 103051646 A | 4/2013 |
| WO | WO 2004/086169 A2 | 10/2004 |
| WO | WO 2012/170441 A2 | 12/2012 |

OTHER PUBLICATIONS

Patent Cooperation Treaty, International Preliminary Report on Patentability, issued Dec. 15, 2015, in PCT/CN2013/089582.

* cited by examiner

SYSTEMS AND METHODS FOR MULTIMEDIA-PROCESSING

CROSS-REFERENCES TO RELATED APPLICATIONS

This application is a continuation of International Application No. PCT/CN2013/089582, with an international filing date of Dec. 16, 2013, now pending, which claims priority to Chinese Patent Application No. 201310236260.4, filed Jun. 14, 2013, both applications being incorporated by reference herein for all purposes.

FIELD

Certain embodiments of the present invention are directed to computer technology. More particularly, some embodiments of the invention provide systems and methods for information processing. Merely by way of example, some embodiments of the invention have been applied to multimedia information. But it would be recognized that the invention has a much broader range of applicability.

BACKGROUND

With development of the Internet technology, multimedia information becomes widely used. For example, a user can release multimedia information on a social networking site for information exchange with other users. Usually, a client may provide a watermark template for the user to add watermark information to the multimedia information before releasing the multimedia information so as to ensure the security of using multimedia information and satisfy the user demands for individualized display of multimedia information. Currently, after a client requests for release of any multimedia information including watermark information, a server directly releases the multimedia information including the watermark information without any additional treatment to the watermark information contained in the multimedia information. As a result, the multimedia information including watermark information is often limited to ordinary information exchange similar to the multimedia information without watermark information, and the usage of the watermark information is not improved.

Hence it is highly desirable to improve the techniques for multimedia processing.

SUMMARY

According to one embodiment, a method is provided for multimedia processing. For example, upon receipt of a multimedia-information-release request, multimedia information to be released is acquired; whether the multimedia information contains watermark information is detected; in response to the multimedia information containing the watermark information, a first topic matching with the watermark information is searched for within one or more predetermined second topics, and the multimedia information and the first topic matching with the watermark information are released.

According to another embodiment, a multimedia-processing device includes: an information-acquisition module, a watermark-detection module, a topic-searching module and an information-release module. The information-acquisition module is configured to, upon receipt of a multimedia-information-release request, acquire multimedia information to be released. The watermark-detection module is configured to detect whether the multimedia information contains watermark information. The topic-searching module is configured to, in response to the multimedia information containing the watermark information, search for a first topic matching with the watermark information within one or more predetermined second topics. The information-release module is configured to release the multimedia information and the first topic matching with the watermark information.

According to yet another embodiment, a server includes a multimedia-processing device. The multimedia-processing device includes: an information-acquisition module, a watermark-detection module, a topic-searching module and an information-release module. The information-acquisition module is configured to, upon receipt of a multimedia-information-release request, acquire multimedia information to be released. The watermark-detection module is configured to detect whether the multimedia information contains watermark information. The topic-searching module is configured to, in response to the multimedia information containing the watermark information, search for a first topic matching with the watermark information within one or more predetermined second topics. The information-release module is configured to release the multimedia information and the first topic matching with the watermark information.

According to yet another embodiment, a non-transitory computer readable storage medium includes programming instructions for multimedia processing. The programming instructions are configured to cause one or more data processors to execute certain operations. For example, upon receipt of a multimedia-information-release request, multimedia information to be released is acquired; whether the multimedia information contains watermark information is detected; in response to the multimedia information containing the watermark information, a first topic matching with the watermark information is searched for within one or more predetermined second topics, and the multimedia information and the first topic matching with the watermark information are released.

For example, the systems and methods described herein can be configured to release multimedia information that contains watermark information together with one or more topics matching with the watermark information so as to improve the utilization of the watermark information and expand the manners in which the topics are released to achieve intelligent multimedia-processing.

Depending upon embodiment, one or more benefits may be achieved. These benefits and various additional objects, features and advantages of the present invention can be fully appreciated with reference to the detailed description and accompanying drawings that follow.

DETAILED DESCRIPTION

Figure 1:
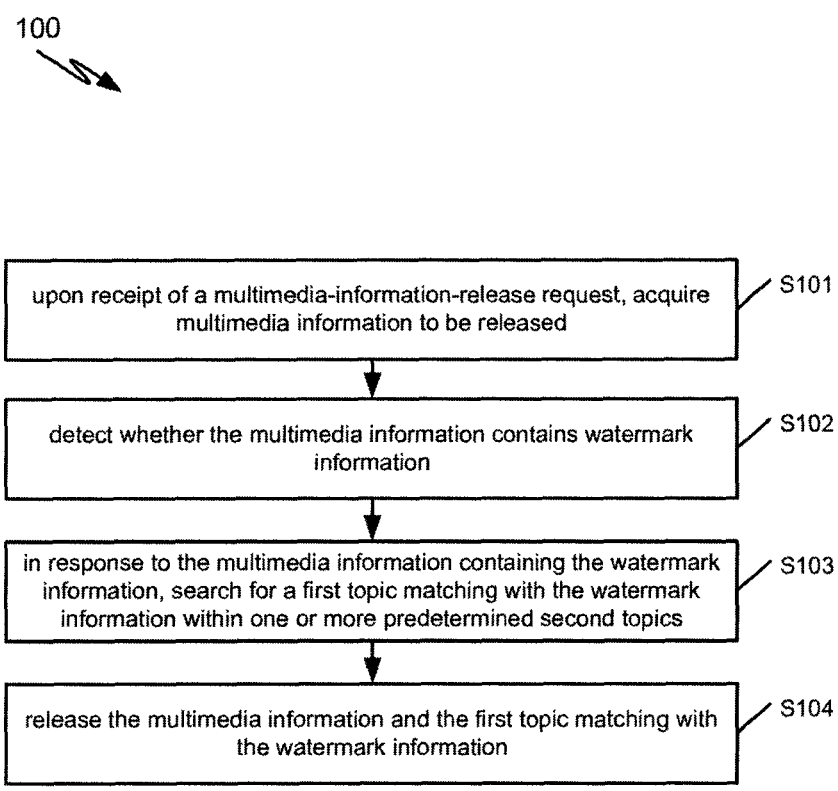
FIG. 1 is a simplified diagram showing a method for multimedia processing according to one embodiment of the present invention.

FIG. 1 is a simplified diagram showing a method for multimedia processing according to one embodiment of the present invention. This diagram is merely an example, which should not unduly limit the scope of the claims. One of ordinary skill in the art would recognize many variations, alternatives, and modifications. The method 100 includes at least the processes S101-S104.

According to one embodiment, the process S101 includes: upon receipt of a multimedia-information-release request, acquiring multimedia information to be released. For example, the multimedia information includes graphic information or video information. As an example, a user may initiate a multimedia-information-release request via a client. In another example, the multimedia-information-release request carries the multimedia information to be released. In yet another example, the multimedia information is generated by a multimedia recording application that the user uses via the client. In yet another example, the multimedia information to be released is acquired upon receipt of the multimedia-information-release request sent from the client. In some embodiments, the client may be a terminal, including a personal computer, a tablet, a cell phone, a smart phone, a laptop, etc. In certain embodiments, the client may be a client module in a terminal, such as a social-networking-services (SNS) client, etc.

According to another embodiment, the process S102 includes: detecting whether the multimedia information contains watermark information. For example, the user uses the multimedia recording application at the client to generate multimedia information, and the client may add watermark information to the multimedia information. As an example, the watermark information includes information generated when the client imports watermark-property information into a predetermined watermark template. In another example, the watermark-property information includes property information of the client that contains at least one of the following: a present geographic location of the client, present weather conditions where the client is located, present time information of the client, etc. In yet another example, the watermark-property information includes self-defined information input by the user, such as: a self-defined geographic location, self-defined weather conditions, self-defined time information, or other suitable self-defined information (e.g., animated information that reflects the user's mood, funny words input by the user, etc.). In some embodiments, the multimedia information (e.g., graphic information, video information, etc.) which contains watermark information enables differentiation of true and false multimedia information and protection of copyrights, and the watermark information in the multimedia information does not affect the visual effect and integrity of the multimedia information.

According to yet another embodiment, the process S103 includes: in response to the multimedia information containing the watermark information, searching for a first topic matching with the watermark information within one or more predetermined second topics. For example, a topic matches with the watermark information if a character string contained in the watermark information is the same as a character string contained in the topic. As an example, the character string contained in the watermark information is "Shenzhen" and the character string contained in a topic is also "Shenzhen." Then the watermark information matches with the topic. In another example, a topic matches with the watermark information if a similarity ratio between the character string contained in the watermark information and the character string contained in the topic reaches a predetermined ratio threshold that is set according to actual needs (e.g., 70% or 80%). As an example, the predetermined ratio threshold is equal to 70%. If the character string contained in the watermark information is "someone loves Shenzhen" and the character string contained in some topic is "love Shenzhen," the similarity ratio between the character string contained in the watermark information and the character string contained in the topic reaches 75%. Therefore, the watermark information matches with the topic. In yet another example, at least one topic matches with the watermark information. As an example, the watermark information is "Ya'an people in Shenzhen." Through a predetermined similarity ratio, two topics that match with the watermark information are found, e.g., "I love Shenzhen" and "Go on, Ya'an."

In one embodiment, the process S104 includes: releasing the multimedia information and the first topic matching with the watermark information. For example, the topic is released in the following manners. 1) A server releases the topic according to a manner determined by the user. As an example, the server releases the topic regarding the user's friends on a SNS site according to the manner determined by the user. 2) The server uses a dedicated page to release the topic. As an example, a page is dedicated to release information related to a topic "Ya'an," and such a page includes all released information related to the topic "Ya'an." In some embodiments, when the multimedia information is released, the topic(s) matching with the watermark information is also released so as to expand the manners for releasing the topics. In certain embodiments, the user can view and manage the released multimedia information and the topic(s) matching with the watermark information.

Figure 2:
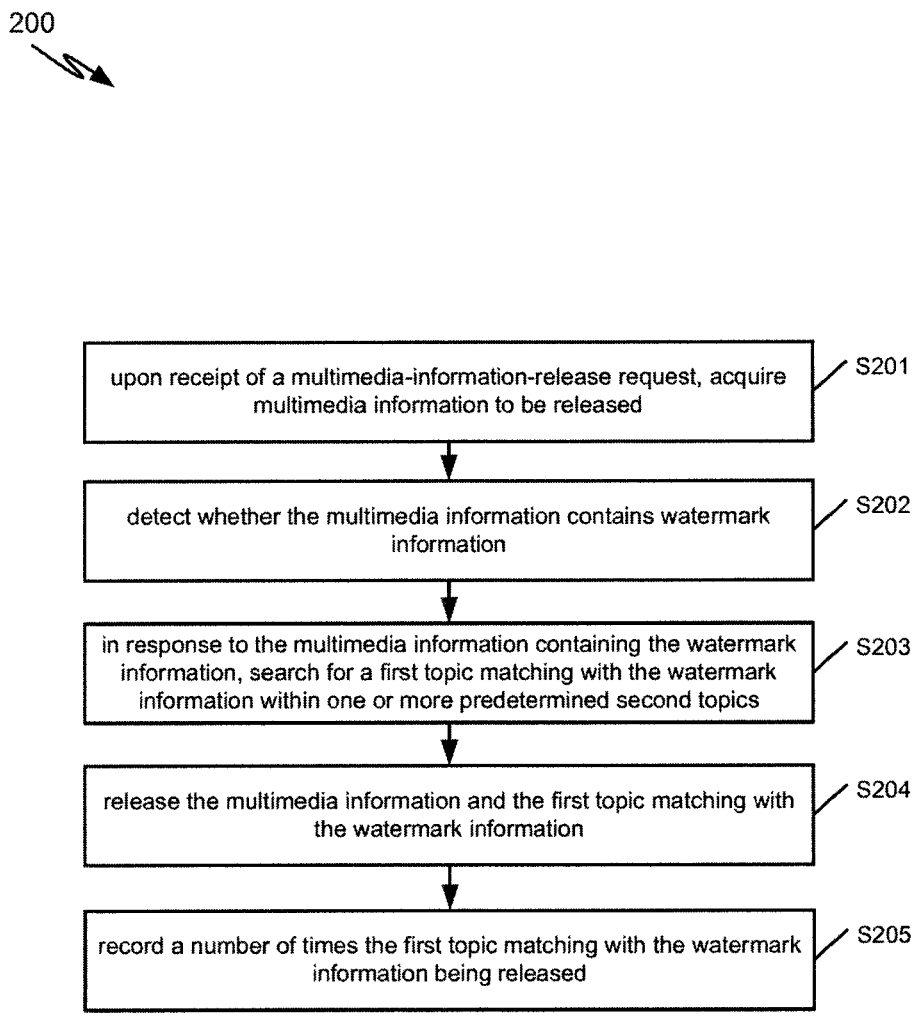
FIG. 2 is a simplified diagram showing a method for multimedia processing according to another embodiment of the present invention.

FIG. 2 is a simplified diagram showing a method for multimedia processing according to another embodiment of the present invention. This diagram is merely an example, which should not unduly limit the scope of the claims. One of ordinary skill in the art would recognize many variations, alternatives, and modifications. The method 200 includes at least the processes S201-S205.

According to one embodiment, the process S201 includes: upon receipt of a multimedia-information-release request, acquiring multimedia information to be released. For example, the process S202 includes: detecting whether the multimedia information contains watermark information. In another example, the process S203 includes: in response to the multimedia information containing the watermark information, searching for a first topic matching with the watermark information within one or more predetermined second topics. In yet another example, the process S204 includes:

releasing the multimedia information and the first topic matching with the watermark information. In some embodiments, the processes S201-S204 are the same as the processes S101-S104, respectively.

According to another embodiment, the process S205 includes: recording a number of times the first topic matching with the watermark information being released. For example, the number of times a topic matching with the watermark information being released is recorded to obtain statistics data related to releases of the topic matching with the watermark information, so as to facilitate adjustment of a control strategy of the topic(s) matching with the watermark information. As an example, the obtained statistics data allows operators to know about the release conditions of the topic(s) matching with the watermark information and to adjust an operating strategy related to the topic(s) matching with the watermark information according to the release conditions.

Figure 3:
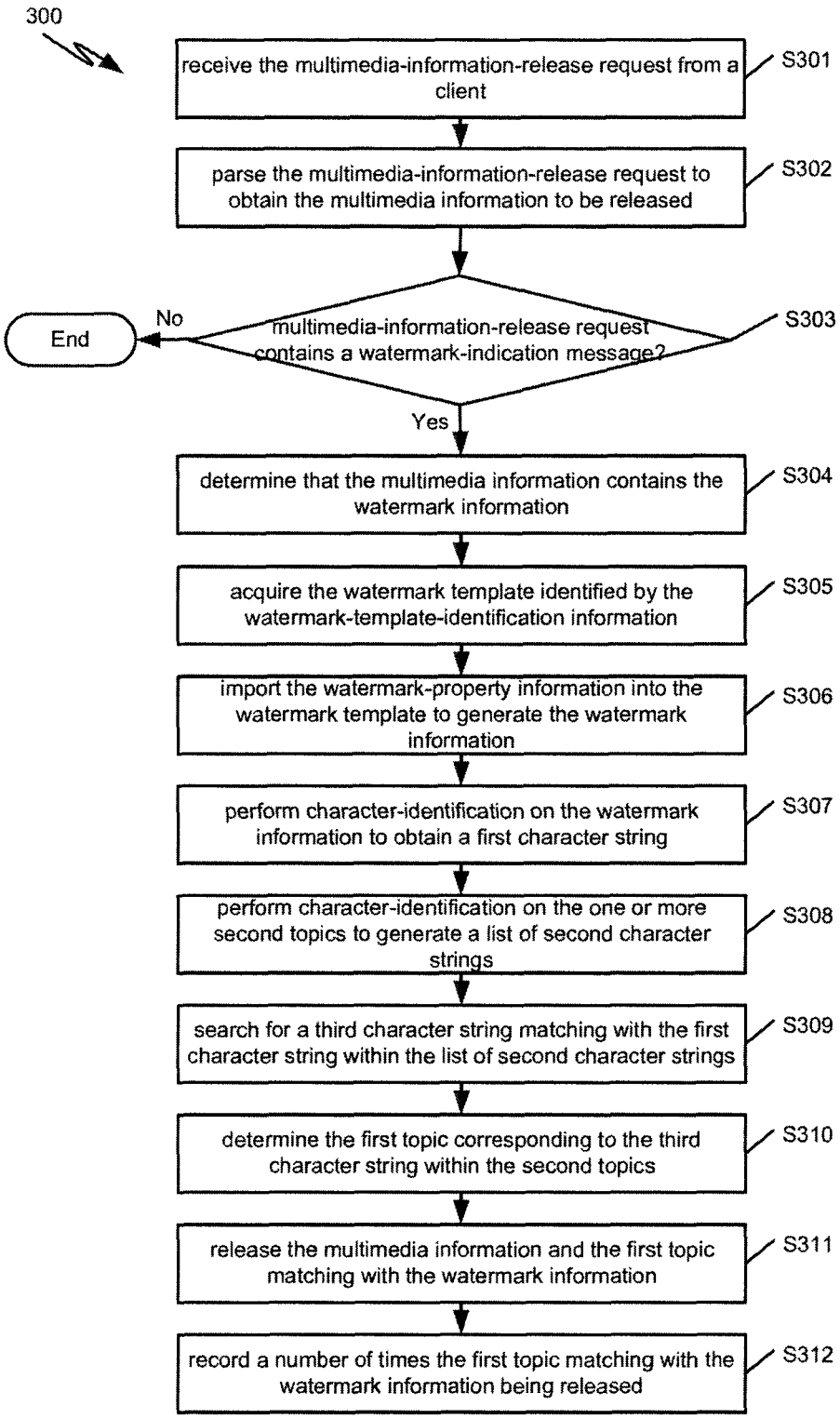
FIG. 3 is a simplified diagram showing a method for multimedia processing according to yet another embodiment of the present invention.

FIG. 3 is a simplified diagram showing a method for multimedia processing according to yet another embodiment of the present invention. This diagram is merely an example, which should not unduly limit the scope of the claims. One of ordinary skill in the art would recognize many variations, alternatives, and modifications. The method 300 includes at least the processes S301-S312.

According to one embodiment, the process S301 includes: receiving the multimedia-information-release request from a client, the multimedia-information-release request containing the multimedia information to be released. For example, the multimedia information includes graphic information or video information. In another example, a user may initiate a multimedia-information-release request via the client. In yet another example, the multimedia-information-release request carries the multimedia information to be released. In yet another example, the multimedia information is generated by a multimedia recording application that the user uses via the client. In yet another example, the process S302 includes: parsing the multimedia-information-release request to obtain the multimedia information to be released. In some embodiments, the processes S301-S302 are included in the process S101 as shown in FIG. 1.

According to another embodiment, the process S303 includes: checking whether the multimedia-information-release request contains a watermark-indication message. For example, if the multimedia-information-release request contains a watermark-indication message, the process S304 is executed. Otherwise, the method 300 ends. In another example, the user uses the multimedia recording application at the client to generate the multimedia information. In yet another example, the client may add the watermark information to the multimedia information and include the watermark-indication message in the multimedia-information-release request, where the watermark-indication message indicates that the multimedia information to be released contains the watermark information. In yet another example, the watermark-indication message includes: watermark-property information and watermark-template-identification information. In yet another example, the watermark information is generated by importing the watermark-property information into a watermark template identified by the watermark-template-identification information. In yet another example, the watermark-property information includes the property information of the client that contains: a present geographic location of the client, present weather conditions where the client is located, present time information of the client, etc. In yet another example, the watermark-property information includes self-defined information input by the user, such as: a self-defined geographic location, self-defined weather conditions, self-defined time information, or other suitable self-defined information (e.g., animated information that reflects the user's mood, funny words input by the user, etc.). In some embodiments, whether the multimedia-information-release request contains a watermark-indication message is detected so as to determine if the multimedia information contains the watermark information. For example, if the watermark-indication message is detected in the multimedia-information-release request, the process S304 is executed. Otherwise, it is determined that the multimedia information contains no watermark information, and the method 300 for multimedia processing ends. In another example, the process S304 includes: determining that the multimedia information contains the watermark information in response to the multimedia-information-release request containing the watermark-indication message. The processes S303-S304 are included in the process S102 as shown in FIG. 1, in certain embodiments.

According to yet another embodiment, the process S305: acquiring the watermark template identified by the watermark-template-identification information. For example, the process S306 includes: importing the watermark-property information into the watermark template to generate the watermark information. In another example, during the processes S305-S306, the server can acquire the content of the watermark information in the multimedia information to facilitate utilization of the watermark information in the multimedia information. In yet another example, the process S307 includes: performing character-identification on the watermark information to obtain a first character string. In yet another example the process S308 includes: performing character-identification on the one or more second topics to generate a list of second character strings, one of the second topics corresponding to one of the second character strings.

According to yet another embodiment, the process S309 includes: searching for a third character string matching with the first character string within the list of second character strings. For example, one or more third character strings within the list of second character strings match with the first character string. In another example, if the third character string is the same as the first character string, the third character string matches with the first character string. As an example, if the first character string is "Shenzhen" and the third character string is also "Shenzhen," the first character string and the third character string match with each other. In yet another example, if a similarity ratio between the third character string and the first character string reaches a predetermined ratio threshold (e.g., 70% or 80%) that is set according to actual needs, the first character string and the third character string match with each other. As an example, the predetermined ratio threshold is 70%. If the content of the first character string is "someone loves Shenzhen" and the content of the third character string is "love Shenzhen," the similarity ratio between the first character string and the third character string reaches 75%, and therefore, the first character string and the third character string match with each other, in some embodiments. For example, the process S310 includes: determining the first topic corresponding to the third character string within the second topics. The processes S305-S310 are included in the process S103 as shown in FIG. 1, in some embodiments.

In one embodiment, the process S311 includes: releasing the multimedia information and the first topic matching with the watermark information. For example, the process S312 includes: recording a number of times the first topic matching with the watermark information being released. The processes S311-S312 are the same as the processes S204-S205 respectively.

Figure 4:
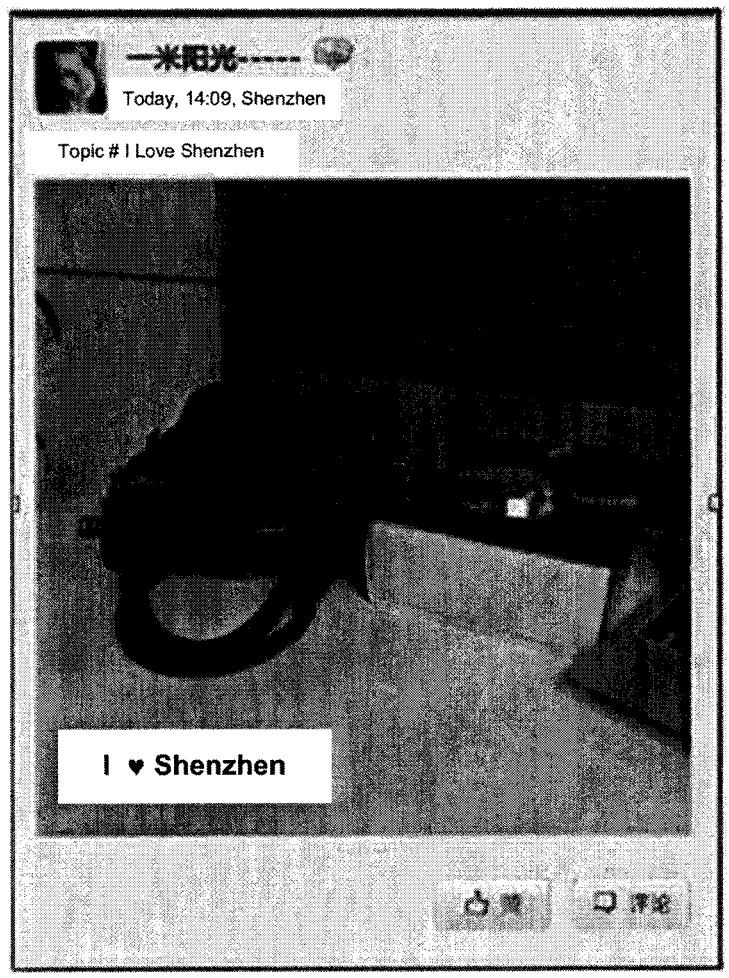
FIG. 4 is a simplified diagram showing multimedia information including watermark information being released according to one embodiment of the present invention.

FIG. 4 is a simplified diagram showing multimedia information including watermark information being released according to one embodiment of the present invention. This diagram is merely an example, which should not unduly limit the scope of the claims. One of ordinary skill in the art would recognize many variations, alternatives, and modifications.

According to one embodiment, a user initiates a multimedia-information-release request via a client. For example, the multimedia-information-release request carries a picture to be released; and the picture contains watermark information "I ♥ Shenzhen." In another example, the client adds a watermark-indication message to the multimedia-information-release request, where the watermark-indication message contains watermark-property information "Shenzhen" and watermark-template-identification information "I ♥ XX."

According to another embodiment, upon receipt of the multimedia-information-release request from the client, the multimedia-information-release request is parsed to obtain the picture to be released. For example, whether the multimedia-information-release request contains a watermark-indication message is detected to determine that the picture to be released contains the watermark information. In another example, a watermark template for "I ♥ XX" is acquired and the watermark-property information "Shenzhen" is imported into the watermark template to generate the watermark information "I ♥ Shenzhen." In yet another example, character-identification is performed on the watermark information to obtain a first character string "I love Shenzhen." In yet another example, character-identification is performed on one or more predetermined topics to generate a list of optional character strings, where the list of optional character strings contain a character string "I love Shenzhen." In yet another example, the list of optional character strings is searched for a second character string matching with the first character string. That is, the second character string is found in the list of optional character strings to be "I love Shenzhen." In yet another example, one or more topics related to the second character string are determined as topic(s) matching with the watermark information. When the picture is released, the topic "I love Shenzhen" is also released, in some embodiments. For example, the number of times the topic "I love Shenzhen" being released is recorded. As an example, a user can view, via the client, the released picture and the released topic as shown in FIG. 4.

Figure 5:
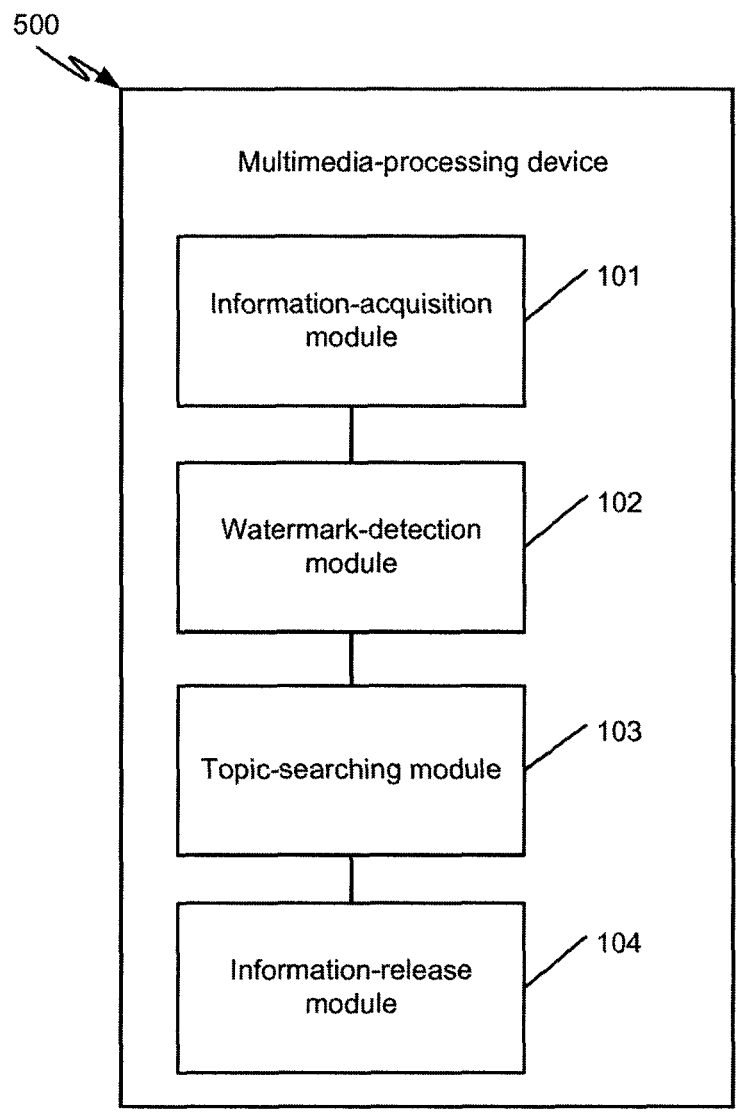
FIG. 5 is a simplified diagram showing a device for multimedia processing according to one embodiment of the present invention.

FIG. 5 is a simplified diagram showing a device for multimedia processing according to one embodiment of the present invention. This diagram is merely an example, which should not unduly limit the scope of the claims. One of ordinary skill in the art would recognize many variations, alternatives, and modifications. The device 500 includes: an information-acquisition module 101, a watermark-detection module 102, a topic-searching module 103 and an information-release module 104.

According to one embodiment, the information-acquisition module 101 is configured to, upon receipt of a multimedia-information-release request, acquire multimedia information to be released. For example, the multimedia information includes graphic information or video information. As an example, a user may initiate a multimedia-information-release request via a client. In another example, the multimedia-information-release request carries the multimedia information to be released. In yet another example, the multimedia information is generated by a multimedia recording application that the user uses via the client. In yet another example, the information-acquisition module 101 acquires the multimedia information to be released upon receipt of the multimedia-information-release request sent from the client.

According to another embodiment, the watermark-detection module 102 is configured to detect if the multimedia information contains watermark information. For example, the user uses the multimedia recording application at the client to generate multimedia information, and the client may add watermark information to the multimedia information. As an example, the watermark information includes information generated when the client imports watermark-property information into a predetermined watermark template. In another example, the watermark-property information includes property information of the client that contains at least one of the following: a present geographic location of the client, present weather conditions where the client is located, present time information of the client, etc. In yet another example, the watermark-property information includes self-defined information input by the user, such as: a self-defined geographic location, self-defined weather conditions, self-defined time information, or other suitable self-defined information (e.g., animated information that reflects the user's mood, funny words input by the user, etc.). The watermark-detection module 102 detects if the multimedia information contains watermark information.

According to yet another embodiment, the topic-searching module 103 is configured to, in response to the multimedia information containing the watermark information, search for a first topic matching with the watermark information within one or more predetermined second topics. For example, a topic matches with the watermark information if a character string contained in the watermark information is the same as a character string contained in the topic. As an example, the character string contained in the watermark information is "Shenzhen" and the character string contained in a topic is also "Shenzhen." Then the watermark information matches with the topic. In another example, a topic matches with the watermark information if a similarity ratio between the character string contained in the watermark information and the character string contained in the topic reaches a predetermined ratio threshold that is set according to actual needs (e.g., 70% or 80%). As an example, the predetermined ratio threshold is equal to 70%. If the character string contained in the watermark information is "someone loves Shenzhen" and the character string contained in some topic is "love Shenzhen," the similarity ratio between the character string contained in the watermark information and the character string contained in the topic reaches 75%. Therefore, the watermark information matches with the topic. In yet another example, at least one topic matches with the watermark information. As an example, the watermark information is "Ya'an people in Shenzhen." Through a predetermined similarity ratio, two topics that match with the watermark information are found, e.g., "I love Shenzhen" and "Go on, Ya'an."

According to yet another embodiment, the information-release module 104 is configured to release the multimedia information and the first topic matching with the watermark information. For example, the topic is released in the following manners. 1) A server releases the topic according to a manner determined by the user. As an example, the server releases the topic regarding the user's friends on a SNS site according to the manner determined by the user. 2) The server uses a dedicated page to release the topic. As an example, a page is dedicated to release information related to a topic "Ya'an," and such a page includes all released information related to the topic "Ya'an." In some embodiments, the information-release module 104 releases the multimedia information together with the topic(s) matching with the watermark information so as to expand the manners for releasing the topics. In certain embodiments, the user can view the released multimedia information and the topic(s) matching with the watermark information after the information-release module 104 completes the information release.

Figure 6:
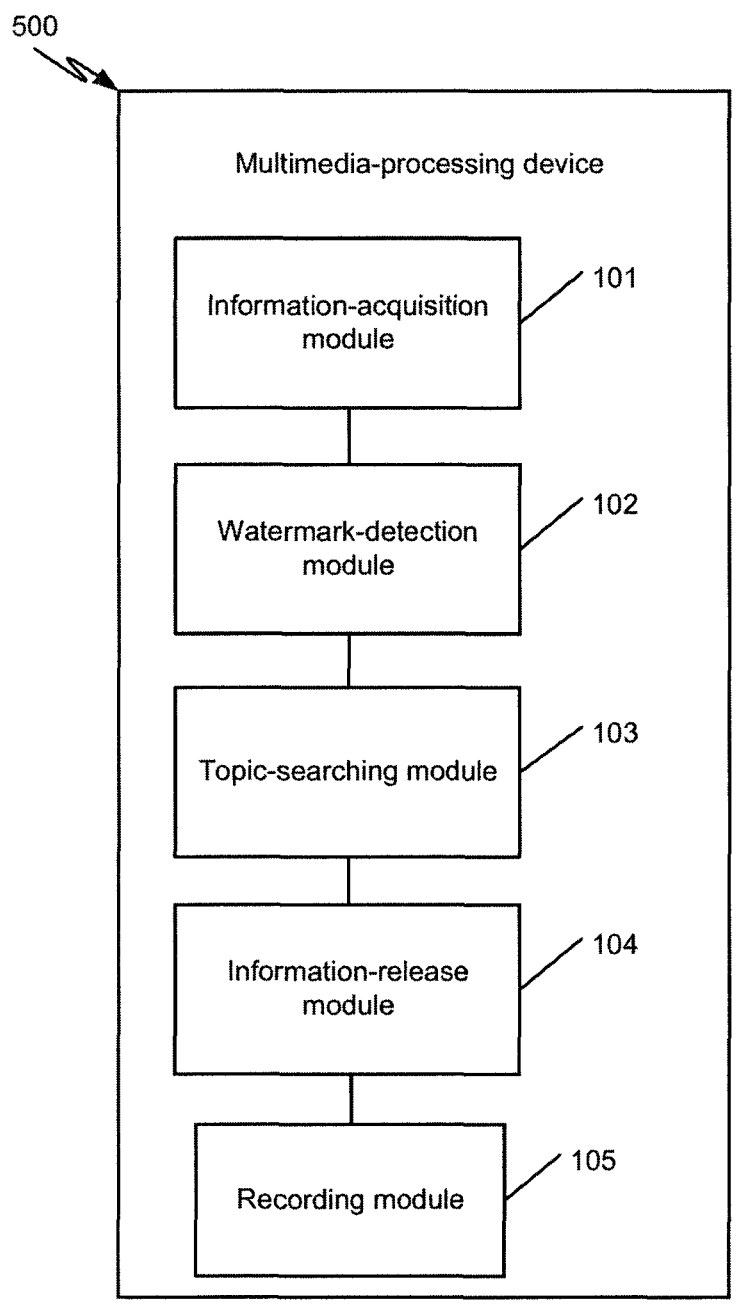
FIG. 6 is a simplified diagram showing a device for multimedia processing according to another embodiment of the present invention.

FIG. 6 is a simplified diagram showing a device for multimedia processing according to another embodiment of the present invention. This diagram is merely an example, which should not unduly limit the scope of the claims. One of ordinary skill in the art would recognize many variations, alternatives, and modifications. In addition to the information-acquisition module 101, the watermark-detection module 102, the topic-searching module 103, the information-release module 104, the device 500 further includes a recording module 105.

According to one embodiment, the recording module 105 is configured to record a number of times the first topic matching with the watermark information being released. For example, the recording module 105 records the number of times a topic matching with the watermark information being released to obtain statistics data related to releases of the topic matching with the watermark information, so as to facilitate adjustment of a control strategy of the topic(s) matching with the watermark information. As an example, the statistics data obtained by the recording module 105 allows operators to know about the release conditions of the topic(s) matching with the watermark information and to adjust an operating strategy related to the topic(s) matching with the watermark information according to the release conditions.

Figure 7:
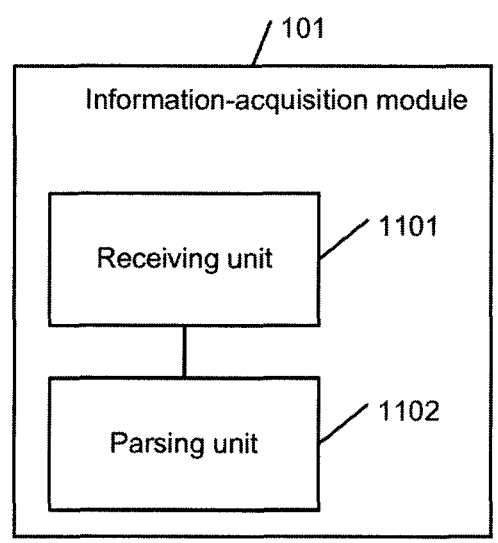
FIG. 7 is a simplified diagram showing an information-acquisition module as part of the device as shown in FIG. 5 according to another embodiment of the present invention.

FIG. 7 is a simplified diagram showing an information-acquisition module as part of the device 500 according to one embodiment of the present invention. This diagram is merely an example, which should not unduly limit the scope of the claims. One of ordinary skill in the art would recognize many variations, alternatives, and modifications. The information-acquisition module 101 includes: a receiving unit 1101 and a parsing unit 1102.

According to one embodiment, the receiving unit 1101 is configured to receive a multimedia-information-release request from a client, the multimedia-information-release request containing the multimedia information to be released. For example, the multimedia information includes graphic information or video information. In another example, a user may initiate a multimedia-information-release request via the client. In yet another example, the multimedia-information-release request carries the multimedia information to be released. In yet another example, the multimedia information is generated by a multimedia recording application that the user uses via the client. In yet another example, the parsing unit 1102 is configured to parse the multimedia-information-release request to obtain the multimedia information to be released.

Figure 8:
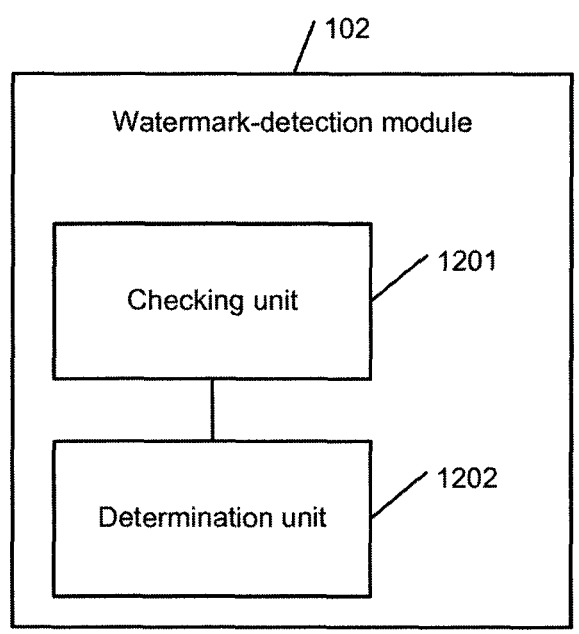
FIG. 8 is a simplified diagram showing a watermark-detection module as part of the device as shown in FIG. 5 according to one embodiment of the present invention.

FIG. 8 is a simplified diagram showing a watermark-detection module as part of the device 500 according to one embodiment of the present invention. This diagram is merely an example, which should not unduly limit the scope of the claims. One of ordinary skill in the art would recognize many variations, alternatives, and modifications. The watermark-detection module 102 includes: a checking unit 1201 and a determination unit 1202.

According to one embodiment, the checking unit 1201 is configured to check if the multimedia-information-release request contains a watermark-indication message. For example, the determination unit 1202 is configured to determine that the multimedia information contains watermark information if the multimedia-information-release request contains a watermark-indication message. In another example, the user uses the multimedia recording application at the client to generate the multimedia information. In yet another example, the client may add the watermark information to the multimedia information and include the watermark-indication message in the multimedia-information-release request, where the watermark-indication message indicates that the multimedia information to be released contains the watermark information. In yet another example, the watermark-indication message includes: watermark-property information and watermark-template-identification information. In yet another example, the watermark information is generated by importing the watermark-property information into a watermark template identified by the watermark-template-identification information. In yet another example, the watermark-property information includes the property information of the client that contains: a present geographic location of the client, present weather conditions where the client is located, present time information of the client, etc. In yet another example, the watermark-property information includes self-defined information input by the user, such as: a self-defined geographic location, self-defined weather conditions, self-defined time information, or other suitable self-defined information (e.g., animated information that reflects the user's mood, funny words input by the user, etc.). In some embodiments, the checking unit 1201 checks whether the multimedia-information-release request contains a watermark-indication message so that the determination unit 1202 can determine if the multimedia information contains the watermark information. For example, if the watermark-indication message is detected in the multimedia-information-release request, the determination unit 1202 determines that the multimedia information contains the watermark information. Otherwise, the determination unit 1202 determines that the multimedia information contains no watermark information.

Figure 9:
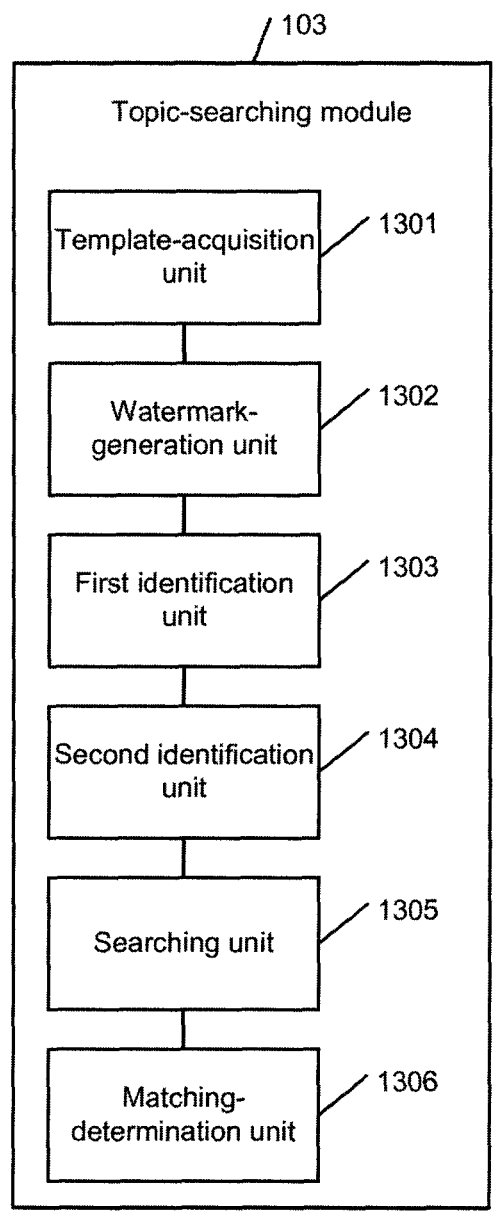
FIG. 9 is a simplified diagram showing a topic-searching module as part of the device as shown in FIG. 5 according to one embodiment of the present invention.

FIG. 9 is a simplified diagram showing a topic-searching module as part of the device 500 according to one embodiment of the present invention. This diagram is merely an example, which should not unduly limit the scope of the claims. One of ordinary skill in the art would recognize many variations, alternatives, and modifications. The topic-searching module 103 includes: a template-acquisition unit 1301, a watermark-generation unit 1302, a first identification unit 1303, a second identification unit 1304, a searching unit 1305 and a matching-determination unit 1306.

According to one embodiment, the template-acquisition unit 1301 is configured to acquire a watermark template identified by the watermark-template-identification information. For example, the watermark-generation unit 1302 is configured to import the watermark-property information into the watermark template to generate the watermark information. Through the processing of the template-acquisition unit 1301 and the watermark-generation unit 1302, the content of the watermark information in the multimedia information can be acquired to facilitate utilization of the watermark information in the multimedia information, in some embodiments. For example, the first identification unit 1303 is configured to perform character-identification on the watermark information to obtain a first character string. In another example, the second identification unit 1304 is configured to perform character-identification on the one or more second topics to generate a list of second character strings, one of the second topics corresponding to one of the second character strings.

According to another embodiment, the searching unit 1305 is configured to search for a third character string matching with the first character string within the list of second character strings. For example, one or more third character strings within the list of second character strings match with the first character string. In another example, if the third character string is the same as the first character string, the third character string matches with the first character string. As an example, if the first character string is "Shenzhen" and the third character string is also "Shenzhen," the first character string and the third character string match with each other. In yet another example, if a similarity ratio between the third character string and the first character string reaches a predetermined ratio threshold (e.g., 70% or 80%) that is set according to actual needs, the first character string and the third character string match with each other. As an example, the predetermined ratio threshold is 70%. If the content of the first character string is "someone loves Shenzhen" and the content of the third character string is "love Shenzhen," the similarity ratio between the first character string and the third character string reaches 75%, and therefore, the first character string and the third character string match with each other, in some embodiments. For example, the matching-determination unit 1306 is configured to determine the first topic corresponding to the third character string within the second topics.

According to yet another embodiment, a method is provided for multimedia processing. For example, upon receipt of a multimedia-information-release request, multimedia information to be released is acquired; whether the multimedia information contains watermark information is detected; in response to the multimedia information containing the watermark information, a first topic matching with the watermark information is searched for within one or more predetermined second topics, and the multimedia information and the first topic matching with the watermark information are released. For example, the method is implemented according to at least FIG. 1, FIG. 2, and/or FIG. 3.

According to another embodiment, a multimedia-processing device includes: an information-acquisition module, a watermark-detection module, a topic-searching module and an information-release module. The information-acquisition module is configured to, upon receipt of a multimedia-information-release request, acquire multimedia information to be released. The watermark-detection module is configured to detect whether the multimedia information contains watermark information. The topic-searching module is configured to, in response to the multimedia information containing the watermark information, search for a first topic matching with the watermark information within one or more predetermined second topics. The information-release module is configured to release the multimedia information and the first topic matching with the watermark information. For example, the device is implemented according to at least FIG. 5 and/or FIG. 6.

According to yet another embodiment, a server includes a multimedia-processing device. The multimedia-processing device includes: an information-acquisition module, a watermark-detection module, a topic-searching module and an information-release module. The information-acquisition module is configured to, upon receipt of a multimedia-information-release request, acquire multimedia information to be released. The watermark-detection module is config-ured to detect whether the multimedia information contains watermark information. The topic-searching module is configured to, in response to the multimedia information containing the watermark information, search for a first topic matching with the watermark information within one or more predetermined second topics. The information-release module is configured to release the multimedia information and the first topic matching with the watermark information. For example, the server is implemented according to at least FIG. 5 and/or FIG. 6.

According to yet another embodiment, a non-transitory computer readable storage medium includes programming instructions for multimedia processing. The programming instructions are configured to cause one or more data processors to execute certain operations. For example, upon receipt of a multimedia-information-release request, multimedia information to be released is acquired; whether the multimedia information contains watermark information is detected; in response to the multimedia information containing the watermark information, a first topic matching with the watermark information is searched for within one or more predetermined second topics, and the multimedia information and the first topic matching with the watermark information are released. For example, the storage medium is implemented according to at least FIG. 1, FIG. 2, and/or FIG. 3.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.).

It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for multimedia processing, the method comprising:
    upon receipt of a multimedia-information-release request, acquiring multimedia information to be released;
    detecting whether the multimedia information contains watermark information;
    in response to the multimedia information containing the watermark information,
        searching for a first topic matching with the watermark information within one or more predetermined second topics; and
        releasing the multimedia information and the first topic matching with the watermark information;
    wherein the searching for a first topic matching with the watermark information within one or more predetermined second topics includes:
        performing character-identification on the watermark information to obtain a first character string;
        performing character-identification on the one or more second topics to generate a list of second character strings, one of the second topics corresponding to one of the second character strings;
        searching for a third character string matching with the first character string within the list of second character strings; and
        determining the first topic corresponding to the third character string within the second topics.

2. The method of claim 1, wherein the acquiring multimedia information to be released includes:
    receiving the multimedia-information-release request from a client, the multimedia-information-release request containing the multimedia information to be released; and
    parsing the multimedia-information-release request to obtain the multimedia information to be released.

3. The method of claim 2, wherein:
    the multimedia-information-release request contains a watermark-indication message indicating that the multimedia information to be released contains the watermark information;
    the detecting whether the multimedia information contains watermark information includes:
        checking whether the multimedia-information-release request contains a watermark-indication message; and
        determining that the multimedia information contains the watermark information in response to the multimedia-information-release request containing the watermark-indication message.

4. The method of claim 3, wherein:
    the watermark-indication message includes: watermark-property information and watermark-template-identification information; and
    the watermark information is generated by importing the watermark-property information into a watermark template identified by the watermark-template-identification information.

5. The method as in any of claim 1, further comprising:
    recording a number of times the first topic matching with the watermark information being released.

6. A multimedia-processing device comprising:
    one or more data processors;
    a computer-readable storage medium;
    an information-acquisition module configured to, upon receipt of a multimedia-information-release request, acquire multimedia information to be released;

a watermark-detection module configured to detect whether the multimedia information contains watermark information;
a topic-searching module configured to, in response to the multimedia information containing the watermark information, search for a first topic matching with the watermark information within one or more predetermined second topics; and
an information-release module configured to release the multimedia information and the first topic matching with the watermark information;
wherein the topic-searching module includes:
a first identification unit configured to perform character-identification on the watermark information to obtain a first character string;
a second identification unit configured to perform character-identification on the one or more second topics to generate a list of second character strings, one of the second topics corresponding to one of the second character strings;
a searching unit configured to search for a third character string matching with the first character string within the list of second character strings; and
a matching-determination unit configured to determine the first topic corresponding to the third character string within the second topics;
wherein the information-acquisition module, the watermark-detection module, the topic-searching module, the information-release module, the first identification unit, the second identification unit, the searching unit, and the matching-determination unit are stored in the storage medium and configured to be executed by the one or more data processors.

7. The device of claim 6, wherein the information-acquisition module includes:
a receiving unit configured to receive the multimedia-information-release request from a client, the multimedia-information-release request containing the multimedia information to be released; and
a parsing unit configured to parse the multimedia-information-release request to obtain the multimedia information to be released;
wherein the receiving unit and the parsing unit are stored in the storage medium and configured to be executed by the one or more data processors.

8. The device of claim 7, wherein:
the multimedia-information-release request contains a watermark-indication message indicating that the multimedia information to be released contains the watermark information;
the watermark-detection module includes:
a checking unit configured to whether the multimedia-information-release request contains a watermark-indication message; and
a determination unit configured to determine that the multimedia information contains the watermark information in response to the multimedia-information-release request containing the watermark-indication message;
wherein the checking unit and the determination unit are stored in the storage medium and configured to be executed by the one or more data processors.

9. The device of claim 8, wherein:
the watermark-indication message includes: watermark-property information and watermark-template-identification information; and
the watermark information is generated by importing the watermark-property information into a watermark template identified by the watermark-template-identification information.

10. The device as in any of claim 6, further comprising:
a recording module configured to record a number of times the first topic matching with the watermark information being released;
wherein the recording module is stored in the storage medium and configured to be executed by the one or more data processors.

11. A server comprising:
a multimedia-processing device including:
one or more data processors;
a computer-readable storage medium;
an information-acquisition module configured to, upon receipt of a multimedia-information-release request, acquire multimedia information to be released;
a watermark-detection module configured to detect whether the multimedia information contains watermark information;
a topic-searching module configured to, in response to the multimedia information containing the watermark information, search for a first topic matching with the watermark information within one or more predetermined second topics; and
an information-release module configured to release the multimedia information and the first topic matching with the watermark information;
wherein the topic-searching module includes:
a first identification unit configured to perform character-identification on the watermark information to obtain a first character string;
a second identification unit configured to perform character-identification on the one or more second topics to generate a list of second character strings, one of the second topics corresponding to one of the second character strings;
a searching unit configured to search for a third character string matching with the first character string within the list of second character strings; and
a matching-determination unit configured to determine the first topic corresponding to the third character string within the second topics;
wherein the information-acquisition module, the watermark-detection module, the topic-searching module, the information-release module, the first identification unit, the second identification unit, the searching unit, and the matching-determination unit are stored in the storage medium and configured to be executed by the one or more data processors.

12. The server of claim 11, wherein the information-acquisition module includes:
a receiving unit configured to receive the multimedia-information-release request from a client, the multimedia-information-release request containing the multimedia information to be released; and
a parsing unit configured to parse the multimedia-information-release request to obtain the multimedia information to be released;
wherein the receiving unit and the parsing unit are stored in the storage medium and configured to be executed by the one or more data processors.

13. The server of claim 12, wherein:
the multimedia-information-release request contains a watermark-indication message indicating that the multimedia information to be released contains the watermark information;
the watermark-detection module includes:
a checking unit configured to whether the multimedia-information-release request contains a watermark-indication message; and
a determination unit configured to determine that the multimedia information contains the watermark information in response to the multimedia-information-release request containing the watermark-indication message;
wherein the checking unit and the determination unit are stored in the storage medium and configured to be executed by the one or more data processors.

14. The server of claim 13, wherein:
the watermark-indication message includes: watermark-property information and watermark-template-identification information; and
the watermark information is generated by importing the watermark-property information into a watermark template identified by the watermark-template-identification information.

15. The server as in any of claim 11, wherein the multimedia-processing device further includes:
a recording module configured to record a number of times the first topic matching with the watermark information being released;
wherein the recording module is stored in the storage medium and configured to be executed by the one or more data processors.

16. A non-transitory computer readable storage medium comprising programming instructions for multimedia processing, the programming instructions configured to cause one or more data processors to execute operations comprising:
upon receipt of a multimedia-information-release request, acquiring multimedia information to be released;
detecting whether the multimedia information contains watermark information;
in response to the multimedia information containing the watermark information,
searching for a first topic matching with the watermark information within one or more predetermined second topics; and
releasing the multimedia information and the first topic matching with the watermark information;
wherein the searching for a first topic matching with the watermark information within one or more predetermined second topics includes:
performing character-identification on the watermark information to obtain a first character string;
performing character-identification on the one or more second topics to generate a list of second character strings, one of the second topics corresponding to one of the second character strings;
searching for a third character string matching with the first character string within the list of second character strings; and
determining the first topic corresponding to the third character string within the second topics.

* * * * *